United States Patent [19]

Brunel et al.

[11] Patent Number: 4,917,141
[45] Date of Patent: Apr. 17, 1990

[54] REMOTELY MANIPULATABLE VALVE

[75] Inventors: Jean Brunel, Bagnolsileze; Maurice Constant, Bagnols-sur-Ceze, both of France

[73] Assignee: Commissariat A L'Energie Atomique, Paris, France

[21] Appl. No.: 278,948
[22] PCT Filed: Feb. 9, 1988
[86] PCT No.: PCT/FR88/00071
§ 371 Date: Oct. 5, 1988
§ 102(e) Date: Oct. 5, 1988
[87] PCT Pub. No.: WO88/05879
PCT Pub. Date: Aug. 11, 1988

[30] Foreign Application Priority Data

Feb. 9, 1987 [FR] France .................. 87 1542

[51] Int. Cl.⁴ .................................. F16K 43/00
[52] U.S. Cl. .................. 137/315; 137/454.6; 251/312
[58] Field of Search ............. 137/315; 251/305, 312, 251/454.2, 454.6

[56] References Cited

U.S. PATENT DOCUMENTS

| 3,111,299 | 11/1963 | Miller | 251/309 |
| 3,133,722 | 5/1964 | McQuire et al. | 251/309 |
| 4,531,537 | 7/1985 | Smith | 251/309 |
| 4,587,990 | 5/1986 | Pennell et al. | 251/309 |
| 4,606,368 | 8/1986 | McCafferty | 137/315 |
| 4,617,957 | 10/1986 | Sandling | 137/315 |
| 4,671,312 | 1/1987 | Bruton | 137/315 |
| 4,727,901 | 3/1988 | Horvei | 137/315 |

FOREIGN PATENT DOCUMENTS

| 0032038 | 3/1984 | European Pat. Off. . |
| 0087824 | 2/1986 | European Pat. Off. . |
| 520332 | 3/1931 | Fed. Rep. of Germany . |
| 35205415 | 6/1985 | Fed. Rep. of Germany . |
| 1425717 | 12/1986 | Fed. Rep. of Germany . |
| 2565664 | 12/1985 | France . |

*Primary Examiner*—George L. Walton
*Attorney, Agent, or Firm*—Oblon, Spivak, McClelland, Maier & Neustadt

[57] ABSTRACT

It comprises on a pipe, a body (1), an internal assembly (20), an actuator (70) and a holding assembly (40). These various parts can be easily locked and released by standard tools and can be extracted or refitted by simple translation. Positioning and centring devices for the different assemblies are provided. Application to valves in contaminated environments, particularly in the nuclear and chemical industries.

12 Claims, 5 Drawing Sheets

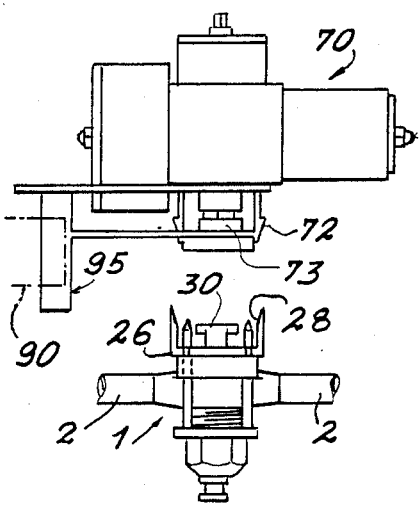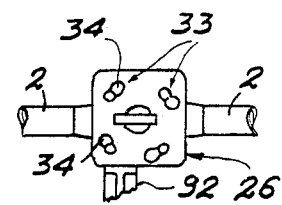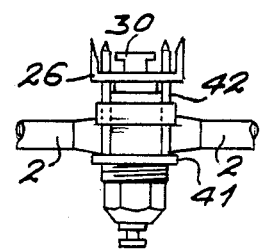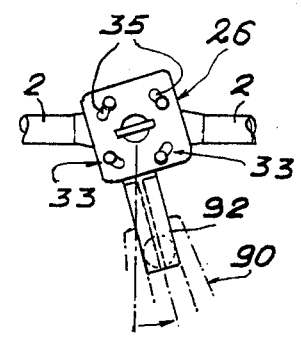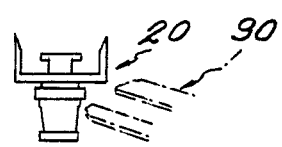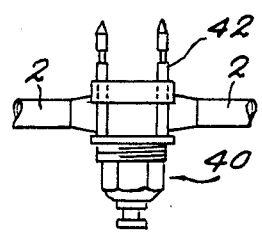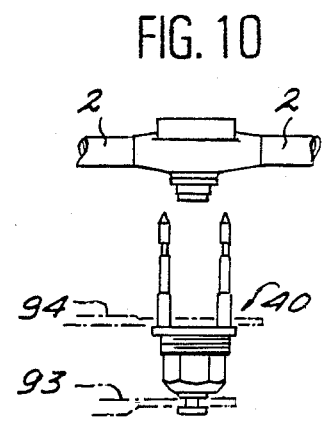

REMOTELY MANIPULATABLE VALVE

DESCRIPTION

1. Technical Field

The present invention relates to a remotely manipulatable or telemanipulatable valve.

2. Background Art

In certain industries it is necessary to place valves in areas which are inaccessible to human intervention due to chemical or radioactive contamination risks. The valves must then be maintained with the aid of telemanipulatable arms with limited possibilities and under the control of an operator observing behind a window or camera. It is therefore necessary to use valves which can be dismantled as easily as possible, particularly as their components made from organic materials tend to deteriorate much more rapidly in such aggressive environments.

On the basis of a presently widely used design, the valves are welded to a coupling, whose ends are joined to the fixed part of the pipe. When maintenance is necessary, the valve and coupling are removed, which leads to a number of disadvantages. Firstly the pipes are completely open to the area and discharge their content there, which can considerably aggravate the pollution thereof. The individual components of the valve remain relatively inaccessible and even routine replacements, such as those of gaskets, require a relatively difficult manipulation of the parts, whose service life is considerably longer and which it would therefore be desired to leave on the pipe.

DISCLOSURE OF THE INVENTION

The valve according to the invention permits rapid and easy manipulations by telemanipulatable arms, as well as partial dismantling during which little attention is paid to those parts of the valve requiring no intervention. In particular, the invention makes it possible to maintain the valve body on the pipe, which considerably simplifies maintenance and to a considerable extent prevents the outflow of products contained therein.

More specifically, the invention relates to a valve incorporating a body permanently fixed to the pipe, characterized in that it also comprises assemblies which can be separated from the body by translation movements substantially perpendicular to the pipe, said assemblies being provided with positioning, locking and release means on the body, a first assembly in particular comprising a member for operating the valve, a second assembly ensuring the locking and release of the first assembly with respect to the body and with the second assembly generally located opposite to the first assembly with respect to the body.

According to a preferred construction, the valve comprises three assemblies, the first assembly in particular incorporating an operating member, the second assembly ensuring the locking or release of the first assembly with respect to the body and the third assembly making it possible to actuate the operating member.

Advantageously, the second assembly is positioned opposite to the first assembly with respect to the body and comprises a nut which bears on said body and controls rods ensuring the locking or release of the first assembly by successively bearing on two opposite shoulders.

The second assembly advantageously comprises a device, whose translation controls the locking or release of the second assembly with respect to the body. The translation device comprises a wedge which, at the time of locking the second assembly to the body, partly pushes a ring into a recess of the body and partly below a shoulder of the second assembly.

Finally, it is advantageous to provide a single positioning member, e.g. on the first assembly, on which the various assemblies are positioned on the body.

BRIEF DESCRIPTION OF THE DRAWINGS

The features and advantages of the invention can be better gathered from the following non-limitative description of preferred embodiments and the attached drawings, which show:

FIGS. 5 to 10: Stages in the disassembly of the valve by remotely manipulatable tools, FIGS. 5, 6, 9 and 10 being views under the same angle as FIGS. 1 to 4, whilst FIGS. 7 and 8 are plan views.

BEST MODE FOR CARRYING OUT THE INVENTION

Firstly a description will be given of the main assemblies constituting the valve.

Figure 2:
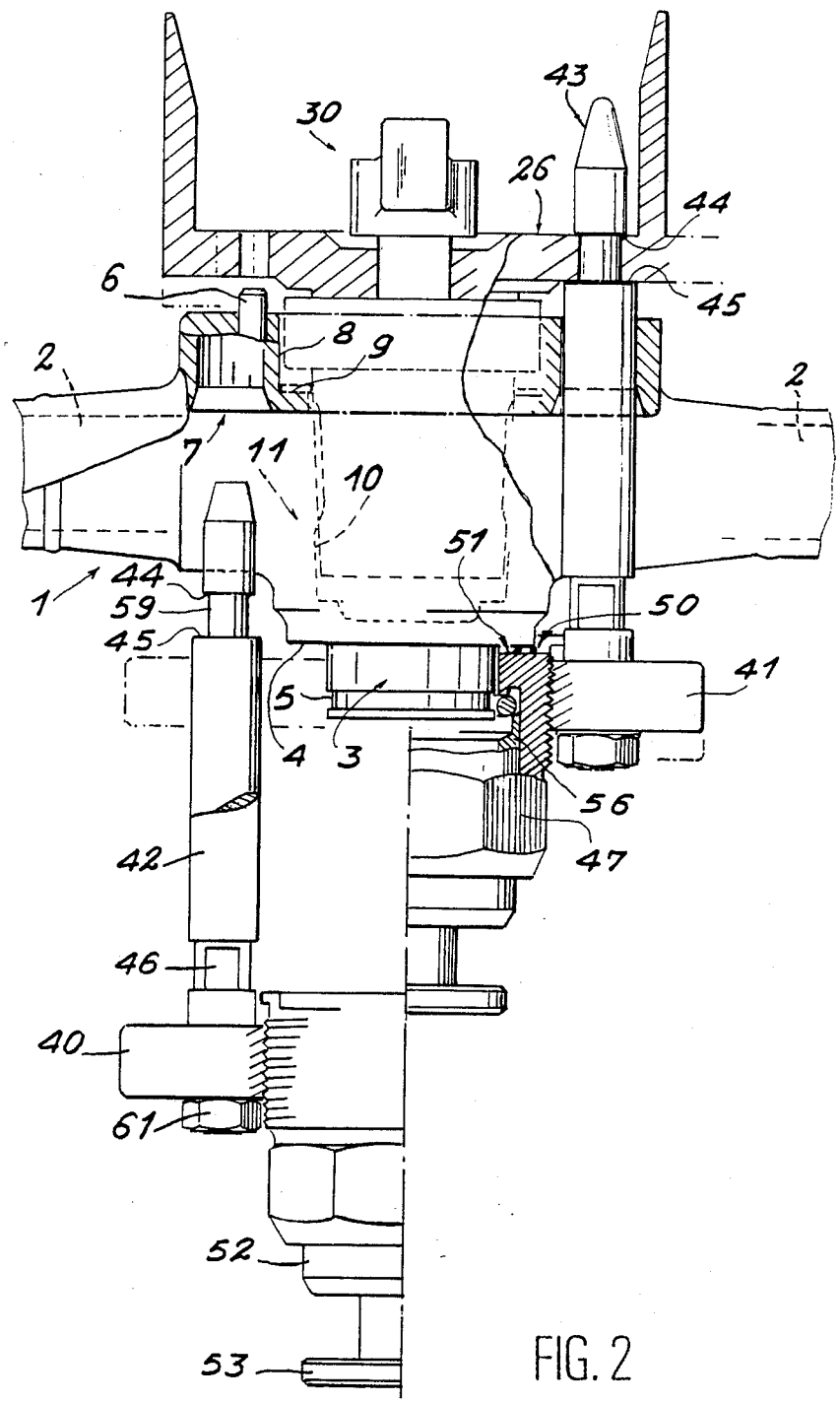
FIG. 2: The body and the second assembly.

Firstly, FIG. 2 shows the valve body 1. It comprises four main parts, namely two pipe couplings 2 fixed to a not shown pipe, a lower end fitting 3 and a central sleeve or core 11, in which are located the mobile parts of the valve. The end fitting 3 has a groove 5. The core 11 is terminated on the side of end fitting 3 by an annular nut bearing surface 4. At the upper end of core 11 are installed in this case three positioning pins 6. Four recesses 7 for rods also vertically traverse the body 1.

Contact between core 11 and the other parts of the valve is firstly assured by a core bearing surface 10, which is a conical surface communicating with the bore of the pipe couplings 2, as well as to the top of the body 1 by an annular cage bearing surface 9, which ends in front of a cylindrical cage bore B.

Figure 1:
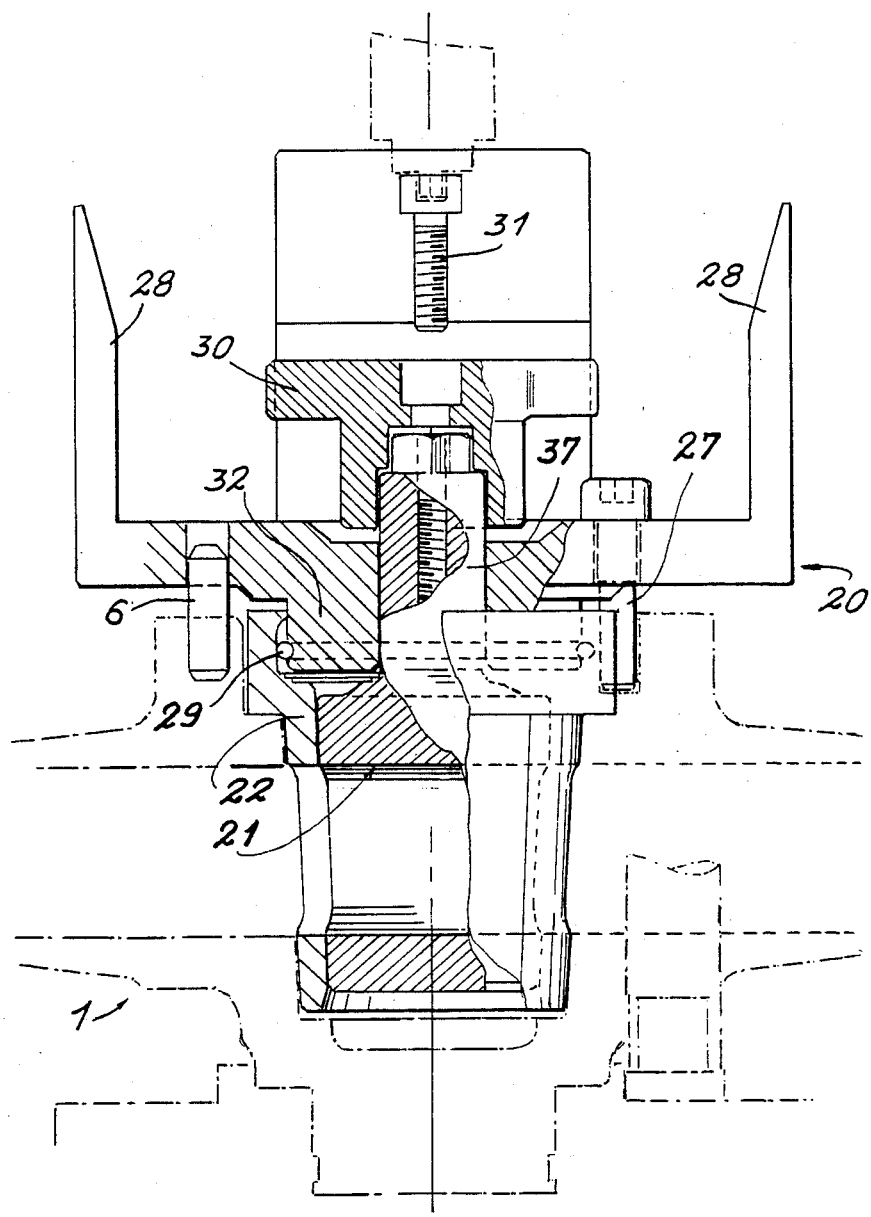
FIG. 1: A first assembly as defined hereinbefore in partial section in a vertical plane passing through the axis of the pipe.

Body 1 contains part of the members of the first assembly or inner assembly 20 in FIG. 1. Inner assembly 20 firstly comprises an operating member 21, which by turns opens and closes the valve. It is locked in a cage 22, which carries rings (not shown) in contact with operating member 21 and core 11, so as to ensure sealing between the fixed and mobile parts of the valve.

The rings are made from an organic material, such as plastic, which has a reduced friction coefficient. Their life is often well below that of the metal components of the valve and consequently they have to be replaced at relatively short intervals.

A cover 26 is connected to cage 22 via a cap 32. A ring 29 disposed both in a groove of cap 32 and in a slot of cage 22 ensures the connection of cage 22 and cover 26, whilst allowing a certain translation between these two parts. However, their relative displacement in rotation is prevented by a setscrew 27.

Cover 26 also has nine orifices, namely three orifices for the positioning pins 6 of body 1, two orifices for the positioning pins 76 of actuator 70, to which reference will be made hereinafter, but these orifices are not generally shown here. Finally, cover 26 has four appendage orifices 33 (cf. FIGS. 7 and 8), whereof the actual orifice is represented by 34 and the appendage by 35. To the periphery of cover 26 are also fixed internal chamfer circumferential plates 2B.

The operating member 21 comprises a spindle 37 traversing cap 32 and cove 26 and at whose end is installed a key or wrench 30 having a polygonal section with the aid of a locking screw 31.

Figure 4:
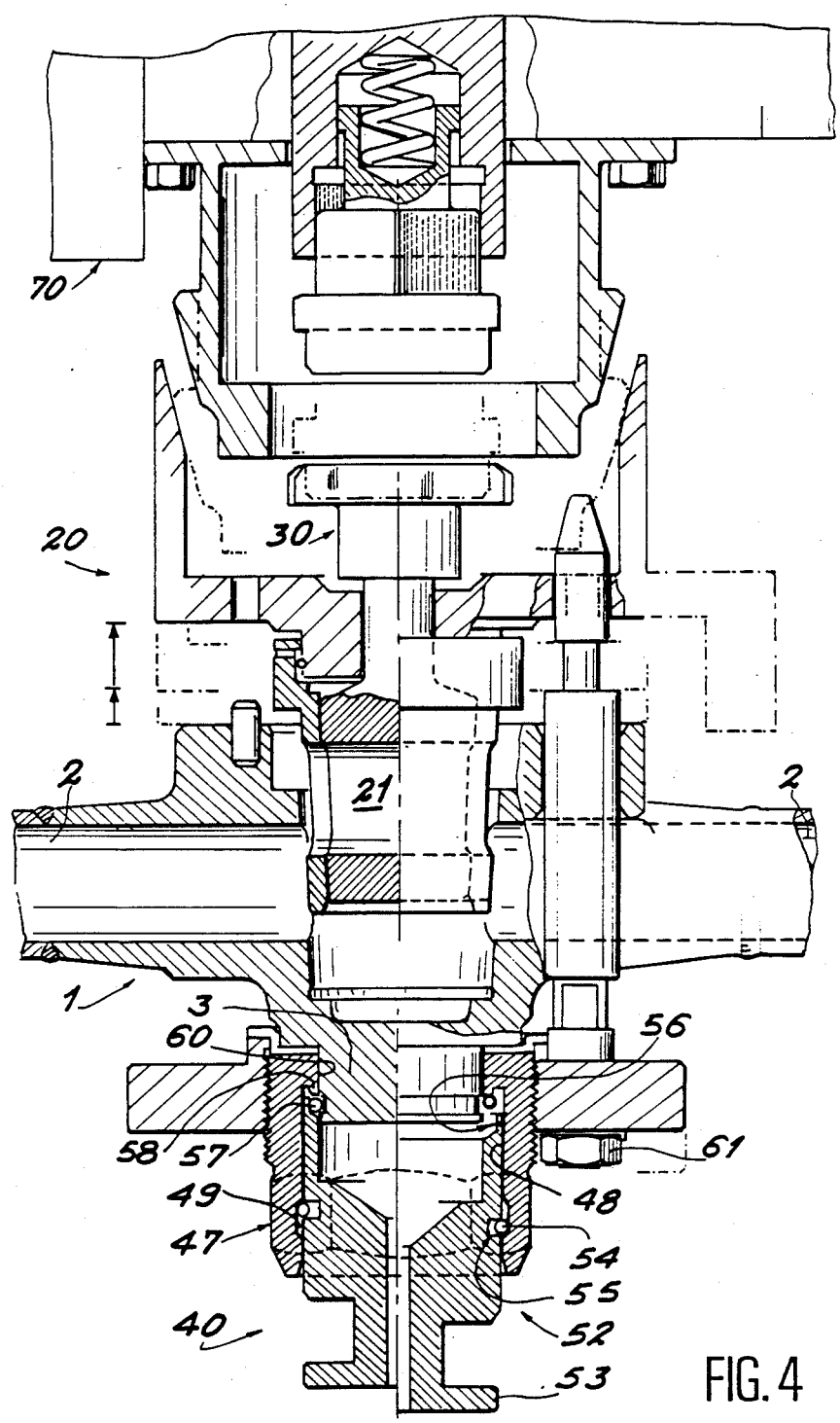
FIG. 4: The assembly of the valve in exploded form.

The valve also comprises a second assembly or holding assembly 40, which is shown in FIGS. 2 and 4. It firstly comprises a support plate 41 for four rods 42, which can slide in recesses for rods 7 located in body 1 until the nut bearing surface 4 comes into contact with a bearing surface of body 51 (via an annular bearing ring 50), which belongs to a nut 47 mobile in a taphole of support plate 41.

The rods 42 have a chamfered end 43 which, on one of them, can carry a marking for a correct angular positioning during a raising of the holding assembly 40. They also have a reduced thickness portion 59 level with cover 26 during the assembly of the valve and which is limited by a lower release shoulder 45 and by an upper locking shoulder 44. In the lower part thereof is also provided an angular guidance zone 46 having a flat, which engages in the support plate 41 and is extended by a thread projecting beyond the lower surface of support plate 41. Lock nuts 61 make it possible to lock rods 42 on support plate 41. The holding assembly 40 also has a special equipment, which will now be described.

Nut 47 has, as can be seen in FIG. 4, a bore 48, in which is made a sliding groove 49. An end fitting bore 60 is made at the top of nut 47 and connected to the nut bore 48, which has a larger diameter, by a support shoulder 5B. When the valve is assembled, end fitting 3 of body 1 is in contact with the end fitting bore 60 and the end fitting groove 5 is located just beneath the support shoulder 58. In front of groove 5 is installed a retaining ring 57, whose internal diameter is larger than the diameter of end fitting 3, so that the holding assembly 40 with the hitherto described parts is not supported by body 1 and would drop under the effect of gravity.

Thus, a generally cylindrical collar 52 is provided and is inserted in nut bore 48. Collar 52 has a retaining ring groove 55, which consequently contains a locking ring 54. When the collar 52 is fitted, the locking ring slides in the sliding groove 49, which is wider than the locking ring groove 55, in a random position between two shoulders limiting the sliding groove 49.

In the upper part of collar 52 is formed a wedge 56 which, when the collar 52 is forced upwards, tends to engage the retaining ring 57 in the end fitting groove 5. When collar 52 has been completely forced back, the retaining ring 57 is radially compressed and exerts a jamming force between end fitting 3 and collar 52. In parallel, it prevents the holding assembly 40 from dropping, whilst establishing a contact between the support shoulder 58 and the lower shoulder of the end fitting groove 5.

In order to disengage the holding assembly 40 from body 1, it is merely necessary to lower collar 50 again until the retaining ring 57 is freed. A flange 53 which projects downwards beyond nut 47 makes it possible to carry out these displacements of collar 52 in a very easy way.

Figure 3:
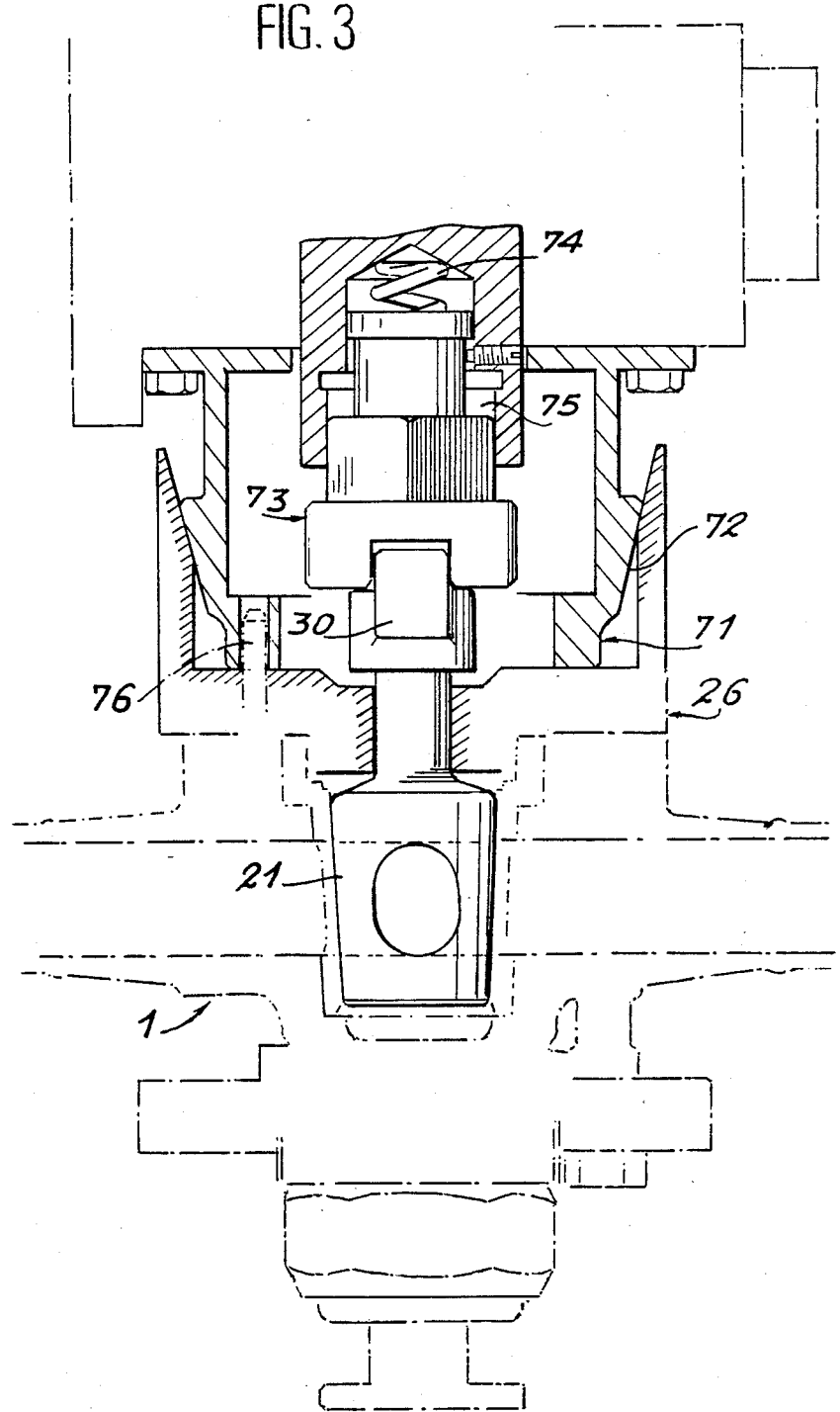
FIG. 3: The essential parts of the first and third assemblies.

The valve finally comprises a third assembly or actuator 70, whose most important part is shown in FIG. 3, the remainder being known per se. It essentially comprises a perforated positioning plate 71, whose orifices receive the chamfered ends 43 of rods 42, as well as the ends of the positioning pins 76 of cover 26, whereof only one is shown here.

A circumferential precentering arch 72 is fitted to the chamfer plates 28 and forms a first contact with the remainder of the valve during assembly.

Operating member 21 can be actuated via an actuating key or wrench 73, whose end is shaped in a complementary manner to that of the key or wrench 30 and wherein meshing is ensured with the aid of a spring 74, which enables the actuator key 73 to slide in a slot 75 and which produces a vertical force parallel to the common axis of the two keys.

The valve assembly is diagrammatically shown in FIG. 4. The internal assembly 20 is placed above the body 1 and held by gravity. In the same way, actuator 70 is above the internal assembly 20 and maintained on the latter by gravity. Finally the holding assembly 40 is located beneath body 1 and held in place with the aid of collar 32 and retaining ring 57. However, said device is inadequate and consequently in normal service rods 42 are used both for maintaining the support plate 41 with the aid of locking nut 61 and for maintaining solid engagement between the internal assembly 20 and body 1, the reduced thickness portions 59 being engaged in appendages 35 and the locking shoulders 44 then bearing on the upper face of cover 26. Thus, rods 42 mainly serve as tie bolts and maintain both the first assembly 20 and the second assembly 40 solidly in place on body 1.

In the case of maintenance operation, the aforementioned valve undergoes special and simplified disassembly and reassembly manipulations justifying the interest attached to the present invention and this will now be described with the aid of FIGS. 5 to 10.

During the dismantling of the valve, the first operation consists of removing actuator 70, as shown in FIG. 5. It is merely necessary to raise actuator 70 with the aid of a telemanipulator arm terminated by a gripper 90 acting on a fitted handle 95. The precentering arches 72 and the chamfer plates 28 on the one hand and the actuator key 73 and key 30 on the other are disjointed. The actuator 70 can then be examined or replaced.

The following stage consists of extracting the internal assembly 20, which takes place in two stages. The first consists of release. Thus, the contact surfaces of the inner assembly 20 and the body 1 are jammed together and the telemanipulators do not have an adequate force to carry out a direct extraction. It is partly for this reason that a holding assembly 40 is provided. The unscrewing of nut 47 involves the raising of support plate 41 and therefore rods 42. The cover 26, which has hitherto been engaged downwards by screws 42 and in contact with the locking shoulders 44 now bears against the release shoulders 45 and is raised. During this time, the retaining ring 57 is engaged by wedge 56 in the end fitting groove 5 and therefore renders nut 47 integral with body 1. This stage is shown in FIG. 1.

This is followed by the actual extraction of the internal assembly 20. A gripper 90 bears on a handle 92 of cover 26 and in parts thereon a rotation in order to arrive at the state of FIG. 8 from that of FIG. 7. The reduced thickness portions 59 of rods 42, which had previously been located in the appendages 35 of the appendage orifices 33, are now located in the actual orifices 34, whose diameter is greater than that of the chamfered ends 43. This rotation has been rendered possible because the previously described release operation has disengaged cover 26 from the positioning pins 6.

Gripper 90 rises and then raises the internal assembly 20, as shown in FIG. 9. It can then bring it to a working station having remote manipulation tools with more extensive possibilities and which can in particular separate cover 26 from cage 22. The description can be based solely on FIG. 1. The first stage is to unscrew the locking screw 31 and setscrew 27, which immobilizes in rotation cover 26 and cage 22. These two latter parts are then grasped and moved as far apart as possible while rotating in such a way that the ring 29 passes out of its recess and can be extracted after cap 32 has been removed.

In order to extract the operating member 21 from cage 22, it is merely necessary to place on said cage an adequately thick spacer, replace key 30 at the end of spindle 37 and lock the locking screw 31. A traction force is then produced in the locking screw 31, which leads to the extraction and freeing of the operating member 21. It is then easily possible to replace all the wear-prone parts of the internal assembly, i.e. more particularly the gaskets between operating member 21 and cage 22 on the one hand and cage 22 and core 11 on the other.

In principle, the dismantling and maintenance operations described hereinbefore should be adequate. However, it may be necessary in certain cases to also extract the holding assembly 40. The procedure according to FIG. 10 is adopted. A finger 93 is placed on the upper face of flange 35 and a support gripper 94 integral with finger 93 is placed above the support plate 41 to limit the travel of collar 52 in bore 48 of nut 47. In a first operation, finger 93 draws flange 53 downwards, which eliminates contact between wedge 56 and retaining ring 57, which then passes out of the end fitting groove 5, as shown in the right-hand half of FIG. 4. The holding assembly is thus disengaged from body 1 and can be transported by the tool constituted by finger 93 and support gripper 94.

Reassembly of the valve will not be described in detail here, because in the opposite direction to disassembly, it involves operations precisely complementary to those described hereinbefore. The only difference is that the centering and positioning pins, as well as the rods 42 in cover 26 must be carried out, which involves a slightly greater manipulating expertise. Nevertheless, the problems involved do not require a special remotely manipulatable tool and can easily be solved by the Expart.

It should be noted that the placing of the second assembly 40 opposite to the first assembly 20 and also the third assembly 70 with respect to the body 1 is very advantageous, because it is not necessary to dismantle the second assembly 40 for extracting the first assembly 20 and moreover remote manipulations take place on elements of the second assembly 40, which are of easy access, because they are isolated from the remainder of the valve.

The description only relates to a preferred embodiment of the invention in which actuator 70 and internal assembly 20, which are the assemblies requiring the most maintenance, are extracted by merely raising and are deposited by gravity. Other variants can be envisaged without passing beyond the scope of the invention as disclosed in the claims.

We claim:

1. A valve comprising a body permanently fixed to a pipe, a plurality of assemblies separable from the body by translation movements substantially perpendicular to the pipe and including:
   a first assembly incorporating an operating member for the valve,
   a second assembly located opposite to the first assembly with respect to the body, wherein the second assembly is made of a first component connected to the body and a second component movable relatively to the first component in one mounting and dismantling direction, the second component comprising opposite surfaces which impinge on the first assembly so as to lock said first assembly on the body and release said first assembly from the body when the second component is moved, and
   stop means on the body for preventing the first assembly from being disengaged from the opposite surfaces when the first assembly is locked while allowing disengagement when the first assembly is released.

2. A valve according to claim 1, wherein the first and the second components comprise a nut and a support plate, respectively, that are threaded together.

3. A valve according to claim 2, wherein the opposite surfaces are established in columns extending along the body, in the mounting and dismantling direction, from the support plate.

4. A valve according to claim 3, which comprises a ring wherein the first component is connected to the body through said ring partly engaged into a groove of the body and partly beneath a shoulder of the first component.

5. A valve according to claim 4, wherein the columns extend through recesses in the body.

6. A valve according to claim 4, wherein the ring comprises an elastic ring which extends outside the groove in a free state, the first component comprising a mobile bolting device provided with a wedge which engages the ring and jams it into the groove.

7. Valve according to claim 6, wherein the bolting device is mobile in the first component through an integral second ring partially extending in a second groove limited by two shoulders.

8. Valve according to claim 1, wherein the stop means comprise pins extending from the body in a dismantling direction.

9. Valve according to claim 8, wherein the first assembly comprises a plate bored for receiving the pins and which includes a plurality of recesses consisting of a narrowed part for engagement with the opposite surfaces and a larger part for disengagement from the opposite surfaces.

10. Valve according to claim 1, comprising a third assembly for actuating the operating member.

11. Valve according to claim 10, wherein the third assembly is placed on the first assembly and is held in place by gravity, the first assembly being situated on the body and the second assembly generally under the body.

12. Valve according to claim 11, wherein the third assembly includes means for operating the operating members for meshing of two coaxial shafts respectively belonging thereto and which are urged together by a spring mechanism.

* * * * *